Figure 1:
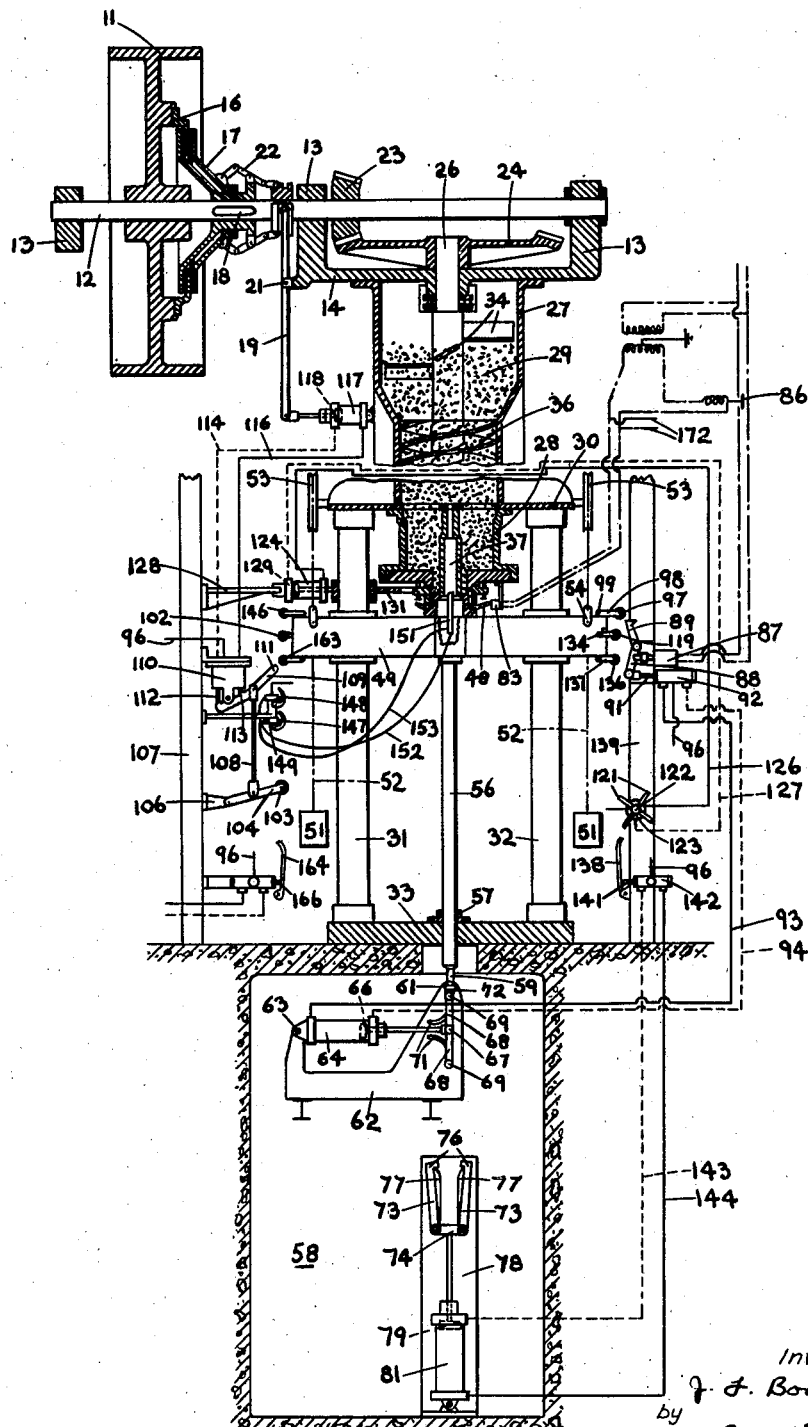

Aug. 30, 1949.   J. F. BOOTH   2,480,442
METHOD OF AND APPARATUS FOR MAKING
PIPES AND CONDUITS OF CLAYWARE
Filed June 10, 1947   3 Sheets-Sheet 1

Inventor
J. F. Booth
by
Watson, Cole, Grindle
& Watson
Attorney

Aug. 30, 1949.    J. F. BOOTH    2,480,442
METHOD OF AND APPARATUS FOR MAKING
PIPES AND CONDUITS OF CLAYWARE
Filed June 10, 1947    3 Sheets-Sheet 2

Inventor
J. F. Booth
by
Watson, Cole, Grindle & Watson
Attorney

Aug. 30, 1949.  J. F. BOOTH  2,480,442
METHOD OF AND APPARATUS FOR MAKING
PIPES AND CONDUITS OF CLAYWARE
Filed June 10, 1947  3 Sheets-Sheet 3
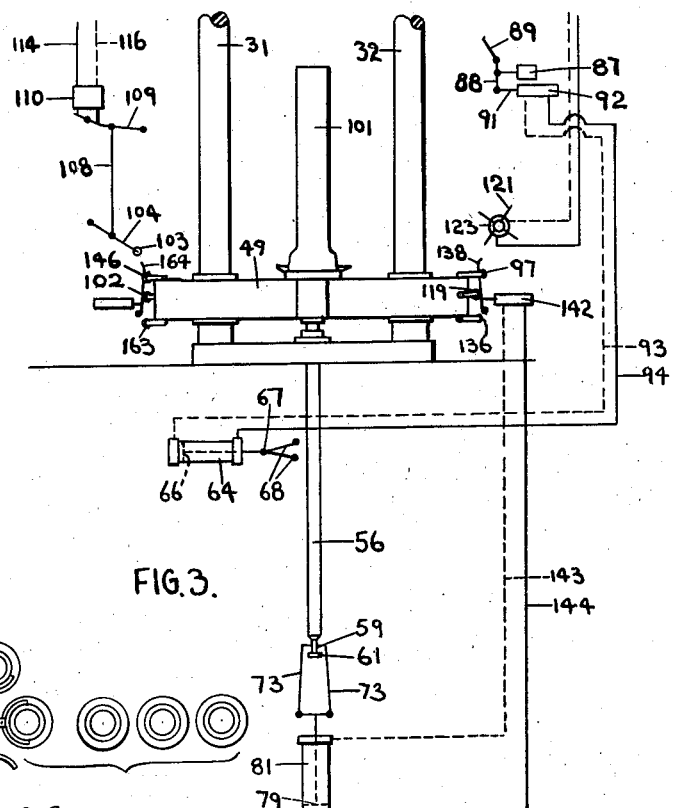
FIG.3.
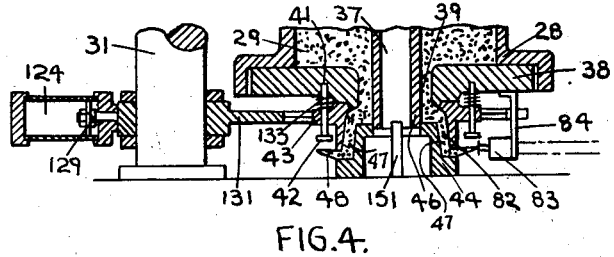
FIG.8
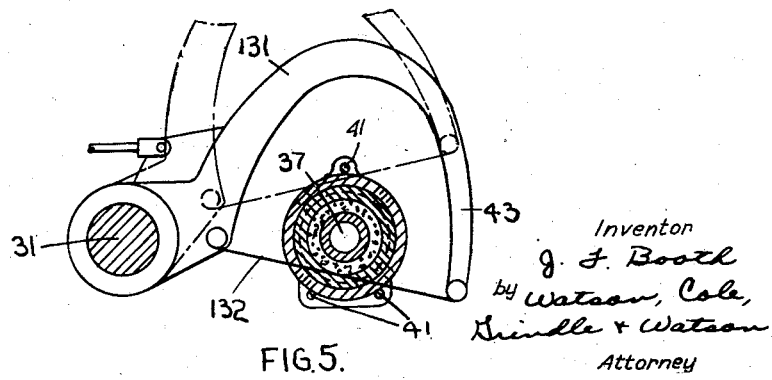
FIG.4.
FIG.5.
Inventor
J. F. Booth
by Watson, Cole,
Grindle & Watson
Attorney Patented Aug. 30, 1949

2,480,442

UNITED STATES PATENT OFFICE 2,480,442

METHOD OF AND APPARATUS FOR MAKING PIPES AND CONDUITS OF CLAYWARE

John F. Booth, Hazlehead, near Sheffield, England

Application June 10, 1947, Serial No. 753,690
In Great Britain June 18, 1946

20 Claims. (Cl. 25—30)

This invention relates to the moulding of pipes, conduits, and similar articles of clayware in moulding presses, and is particularly directed to reducing the manual control ordinarily found necessary with such presses.

In the manufacture of socketed articles, it is usual for the clay to be extruded downwardly into a mould containing a core (or a number of cores) and then to be forced from the mould whilst supported on a table that remains locked against the end of the mould until formation of the socket is completed and is then lowered. Release of the table and cutting-off of the extruded article to approximately its required length are performed manually by an attendant. Lowering of the table enables each article in turn to be removed from the press for finishing operations.

According to the present invention, there is provided a moulding press for forming pipes, conduits, or like articles from clay, wherein a fringe of clay is allowed to exude between the end of a mould and the face of a supporting table for the time being locked against the end of the mould as evidence of the completion of a moulding operation of the press, and wherein means responsive to the exudation of said fringe are provided for effecting release of the table, thus allowing the moulded article to be extruded from the mould without manual control. Preferably, the severance of the article to approximate length by a cut-off wire or the like is automatically effected by the movement of the table at or near the end of its movement.

The fringe preferably contacts a switch (which should preferably operate in a low-voltage circuit) serving to energize a relay powerful enough to actuate one or more devices, e. g., electric, pneumatic, hydraulic, or mechanical devices, or combinations thereof, which effect release of the table.

According to a further feature of the invention, the table is lowered below the position it reaches when the full length of the article has been extruded, to permit the article to be transferred from the press. For this purpose, a head on the lower end of a centre rod or other extension carried by the table (which head co-operates with the table-locking device when the table is pressed against the end of the mould) is seized by a grabbing device and pulled downwards. This grabbing device then thrusts the table upwards into locking position, releasing itself from the head and allowing the locking device to re-engage.

The transfer of the pipe may be effected manually, but preferably a transfer mechanism is used, e. g., of the type described in U. S. Patent Application Serial No. 753,691, filed on even date herewith, to reduce manual attention. In such a case, the operation of the transfer mechanism is co-ordinated with the movements of the press mechanism initiated by the production of the fringe. The finishing operations are also preferably effected automatically, e. g., by a machine as described in U. S. Patent Application Serial No. 753,692, filed on even date herewith, and again coordination between the operation of the press and the finishing machine may be provided for by permitting the fringe to bring about actuation of the finishing machine.

In addition to controlling the cut-off device, the table movement is conveniently used to control various other operations, such as starting and stopping of the screw or other extrusion device, e. g., by means of a clutch or valve, operation of the grabbing device, and re-engagement of the table-locking device. Again, a nozzle carried by the table may be connected to an oil-pipe to spray the moulding faces as the table approaches the end of the mould.

The invention is particularly suited to the production of a socketed pipe or conduit, the table co-operating with the base of the mould to shape the socket portion, while the pipe portion is extruded during the lowering of the table. Multiple conduits may be produced by the use of a multiple mould and an appropriately shaped table.

The invention will now be described in greater detail with reference to the accompanying drawings, which are largely diagrammatic, as applied to the manufacture of socketed pipes suitable for use as conduits.

In the drawings:

Figure 1 is a part-sectional elevation of a moulding press constructed according to the invention.

Figures 2, 6, 7:
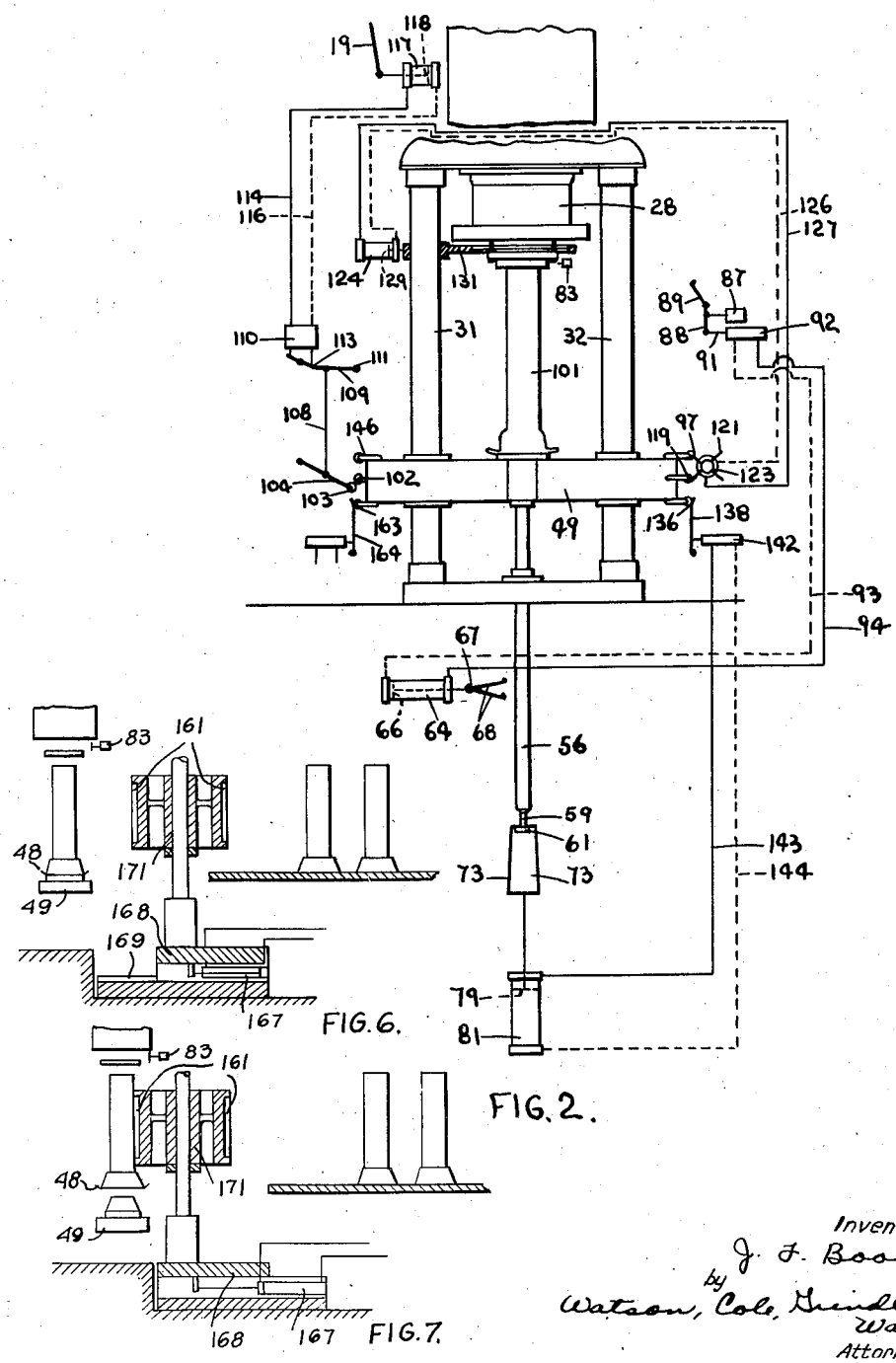

Figures 2 and 3 are views similar to Figure 1, showing the various parts of the apparatus in different positions during the formation of a pipe, Figures 4 and 5 are an elevation and plan, respectively, of part of the apparatus shown in Figure 1, drawn to a larger scale, and Figures 6, 7 and 8 are diagrams illustrating the transfer of the pipes from the press to a finishing machine.

Referring to Figures 1 to 3, the press is driven by a suitable source of power through a belt pulley 11 freely mounted on a driving shaft 12 housed in suitable bearings 13 in the main framework 14 of the machine. The pulley 11 is provided with a clutch plate 16 co-operating with a toggle-operated clutch, generally indicated by reference numeral 17, slidably mounted on the shaft 12 and driven by a feather key 18, the clutch being operable by a clutch lever 19, pivoted at 21 on the framework 14, through toggle linkage generally indicated by reference numeral 22. Secured to the driving shaft 12 is a bevel pinion 23 arranged in engagement with a bevel wheel 24 secured to a vertical shaft 26 rotatably mounted in suitable bearings in a feed chamber 27 surmounting a mould chamber 28. The feed chamber is provided with an inlet chamber (not shown) through which the clay 29 is fed at required intervals. The mould chamber 28 depends from a wall member 30 forming part of the framework 14 and spanning a pair of pillars 31 and 32 secured to a base plate 33 at floor level. The clay 29 is fed downwardly in the feed chamber 27 by inclined blades 34 attached to the shaft 26, the blades feeding the clay 29 to a continuous worm 36 secured to the shaft 26 in the lower part of the feed chamber. The worm 36 extrudes the clay 29 into the mould chamber 28 through suitable apertures in the wall member 30.

Depending from the wall member 30 is a central core 37 which extends through a central opening in the base 38 of the mould chamber leaving an annular extrusion throat 39. Slidably mounted on studs 41 formed with heads 42 is an annular die 43 the inside surface of which is shaped to conform to the outer surface of the socket portion of the pipe. The die 43 is held in position against the lower face of the base 38, during the moulding operation, by the flange 44 of a flanged annular core member 46 the outer surface of which is shaped to conform to the inner surface of the socket portion of the pipe. The flange 44 is notched at intervals to form passages 47 giving access to the annular space between the core member 46 and the die 43 so as to permit a fringe 48 of clay to exude between the upper face of the flange 44 and the lower face of the die 43 during the formation of the socket portion of the pipe.

The core member 46 is secured to a table 49 slidably mounted on the pillars 31 and 32 and provided with counterweights 51 attached to chains 52 passing over pulleys 53, the other ends of the chains being secured to brackets 54 attached to the table 49. The table 49 is provided with a central shaft 56 which passes through a bearing 57 in the base plate 33 and extends into a pit 58 below floor level. The shaft 56 is formed near its extremity with a reduced portion 59 and terminates in a head 61. The table 49 is locked in the moulding position by a locking device consisting of a pair of frames 62 between which is pivotally mounted at 63 a cylinder 64 containing an air piston 66 pivotally connected at 67 to a pair of toggle links 68 provided with pins 69 arranged to ride in curved slots 71 in the frames 62, the upper link being provided with a locking pad 72 which bears against the head 61 of the shaft 56 when the table is in locked position.

Arranged below the locking device in the pit 58 is a grabbing device consisting of a pair of hook members 73 pivotally attached to a crosshead 74 and provided with pins 76 arranged to bear in cam slots 77 in a pair of frames 78 secured in the pit 58. The crosshead 74 is attached to an air piston 79 arranged to slide in a cylinder 81 attached to the frames 78. The hook members 73 are caused by the slots 77, during the downward stroke of the piston 79, firstly to move towards each other for the purpose of engaging the head 61 of the shaft 56 when the table is at the limit of its movement under extrusion as described below, and then to remain in engagement with the head 61 during the downward stroke of the piston 79 so as to give the table 49 an additional downward movement for the purpose of removing the extruded pipe as described below.

In Figure 1, the various parts of the press are shown in the positions that they assume just after the commencement of an extrusion cycle, the table 49 being for the time being locked against the base of the moulding chamber by the locking device. A complete cycle of operations of the press will now be described together with the construction and operation of various mechanisms not previously described, as they perform their functions.

The clay is extruded into the mould chamber 28 by the worm 36, the clutch 17 being engaged and the shaft 26 rotating. As the clay moves downwardly in the mould chamber, it is extruded through the annular throat 39 and first fills up the annular space between the core member 46 and the annular die 43 so as to form the socket portion 82 of the pipe. As soon as the annular space is filled and the socket portion thus completed, further extrusion pressure causes clay to exude from the passages 47 in the flange 44 to form the fringe 48, extrusion continuing until a portion of the fringe 48 strikes a spring-loaded switch member 83 attached to a bracket 84 depending from the base 38 of the mould chamber. The amount of fringe allowed to be extruded is controlled by the position of the switch member 83 which can be adjusted by means of a slot in the bracket 84. The switch is wired in a low voltage circuit, and operates a second switch 86 in a high voltage circuit, the switch 86, in turn, operating a solenoid 87. The circuits are shown diagrammatically in Figure 1.

The solenoid 87 is pivotally attached to one arm 88 of a two-armed lever 88, 89 the arm 88 being also pivotally attached to the stem 91 of an air valve 92 controlling the piston 66 of the locking device through circuits 93 and 94, compressed air at a pressure of about 100 lbs. per square inch being fed to the valve 92 through a pressure line 96. The other arm 89 of the two-armed lever 88, 89 is caused, upon operation of the solenoid 87 to move into a position in the downward path of a roller 97 carried by an arm 98 pivotally mounted at 99 on the upper surface of the table 49 so as to be freely pivotable in an upward direction but prevented from pivotal movement in a downward direction by the upper surface of the table.

In Figure 1, the switch member 83 has just been operated by the fringe 48 and the solenoid 87 has moved the lever 88, 89 to operate the valve 92 to disengage the locking device from the shaft 56, thus leaving the table 49 free to move downwardly. As soon as the table is released, it is forced downwardly by the clay extruding from the throat 39, such motion causing the formation of the body portion 101 of the pipe as shown in Figure 2, the socket portion 82 descending with the core member 46. The table 49 continues its downward movement under the extrusion pressure until a roller 102 mounted on the table 49 strikes a roller 103 carried by a valve-operating arm 104 pivotally mounted in a bracket 106 extending from an upright 107 forming part of the general framework 14. The valve-operating arm 104 is connected by a pivoted link 108 to a similar arm 109 pivotally mounted on a valve chest 110 and carrying a roller 111, the arm 109 being connected to valve members 112 and 113. The valve chest 110 is connected by conduits 114 and 116 to an air cylinder 117 pivotally mounted on the framework 14 and containing a piston 118 pivotally attached to the clutch-operating lever 19, the valve chest being fed by the main pressure conduit 96. The arm 104 is moved by the roller 102 through a considerable arc in operating the valve members 112 and 113 so as to be clear of the roller 102 on the return stroke of the table 49, and at the same time to move the arm 109 to such a position that its roller 111 lies in the path of the roller 102 on the upward stroke of the table 49.

As mentioned above, the table 49 continues its downward movement until the roller 102 strikes the roller 103 whereupon compressed air is caused to flow through the conduit 114 and causes the piston 118 to move to the right (as viewed in Figure 1) and pivot the lever 19 in the direction of release, thus disengaging the clutch 17 and stopping the extrusion process. The table 49 is thus brought to rest. As the table approaches the limit of its extrusion movement, a roller 119 engages the adjacent one of four projections 121 of a star wheel 122 arranged in the path of the roller 119 and causes it to rotate through a quarter of a revolution to operate a rotary valve 123 through which air from the main pressure line 96 is supplied to an air cylinder 124 through conduits 126 or 127, the cylinder 124 being pivotally attached to a bracket 128 extending from the upright 107. A piston 129 arranged in the cylinder 124 is connected to a cutter bow 131 pivotally mounted on the pillar 31 and containing a cutting wire 132 movable within the zone bounded the studs 41. As the rotary valve 123 is operated, therefore, compressed air is supplied to the cylinder 124 and the cutter bow is caused to swing so that the cutting wire 132 passes through the extruded pipe at a position between the lower face of the base 38 of the mould and the upper face of the die 43, the die 43 having dropped on to the heads 42 of its supporting studs 41 upon commencement of the downward movement of the table 49, the dropping of the die 43 being assisted by weak springs 133 embracing the studs 41 between the die and the base 38. The roller 119 is carried in an arm 134 pivotally mounted on the side of the table 49 so as to be freely pivotable in a downward direction but prevented from pivoting in an upward direction by a stop, the arm 134 being held in its horizontal position by a spring.

Substantially simultaneously with the operation of the rotary valve 123 by the roller 119, a roller 136 mounted in an arm 137 on the table 49 in a manner similar to that of the rollers 97 and 119, being allowed to swivel downwardly from the horizontal but not upwardly, is caused to strike a valve-operating slipper 138 pivotally mounted on an upright 139 forming part of the framework 14. The slipper 138 is arranged in engagement with the stem 141 of an air valve 142 connected to the grabber cylinder 81 by conduits 143 and 144 and supplied with compressed air from the main pressure line 96, the stem being spring-urged outwardly so as to urge the slipper into the path of movement of the roller 136, a stop being provided on the slipper to limit the action of the spring. Upon engagement of the slipper 138 by the roller 136, compressed air is fed by the conduit 143 to the upper end of the cylinder 81 and the piston 79 is caused to move downwardly, thus causing the hook members 73 to move inwardly to grab the head 61 of the shaft 56. The table 49 thus comes to rest momentarily at the limit of its extrusion movement, the completed pipe being severed by the wire 132 during the rest period. The position of the various parts of the apparatus during the rest period is indicated in Figure 2, the completed pipe having been severed and the hook members 73 being about to grab the head 61 of the shaft 56.

Continued downward movement of the piston 79 of the grabbing device causes the hook members 73 to drag the table 49 further down to the position shown in Figure 3, in which position, the completed pipe is clear of the die 43 and can be removed from the table. During this movement, the roller 136 moves clear of the slipper 138 and thus allows the slipper to spring outwardly, such action reversing the valve and causing the piston 79 to rise, and whilst the valve is reversed substantially simultaneously with the table 49 reaching its lowermost position under the action of the grabbing device, the table does not start to rise immediately because of the length of the reduced portion 59 of the shaft 56, the hook members 73 moving idly over the reduced portion. The table 49 thus has a definite dwell at its lowermost position, the duration of the dwell being determined by the length of the reduced portion 59 of the shaft 56. The completed pipe is removed from the table during the dwell by a transfer mechanism referred to below.

The action of the grabbing device on the upward stroke of the piston 79 is to thrust the table upwardly, assisted by the action of the counter weights 51, the hook members being thrown clear of the shaft 56 towards the top of the stroke by the action of the cam slots 77, and the table continues its upward motion under its own momentum. During the upward movement, the rollers 136 and 119 drag downwardly against the slipper 138 and star wheel 122, respectively, and thus have no operative action. As the table approaches the mould chamber, a roller 146 having a positive action only in the upward direction strikes a pair of valves 147 and 148 in succession, the valve 147 operating an oil injector 149 so as to deliver a small quantity of oil into a spray nozzle 151 through a conduit 152 while the valve 148 is an air valve and passes compressed air through a conduit 153 to the nozzle 151 and thus causes the oil to issue from the nozzle in the form of a spray which is directed on to the moulding surfaces of the core member 46 and the die 43.

As the table 49 is about to reach the base of the mould chamber, the roller 97 strikes the arm 89 of the two-armed lever 88, 89 and causes it to reverse the valve 92, thus once more bringing into operation the locking device which rams the table upwardly against the base of the mould chamber, the flange 44 of the core member 46 causing the die 43 to be moved upwardly on its studs 41 and nipped between the flange 44 and the base 38. Substantially simultaneously with the action of the roller 97, the roller 102 strikes the roller 111 on the arm 109 and causes the valve members 112 and 113 to reverse and operate the piston 118 to engage the clutch 17. Extrusion of the clay 29 now starts once more and the cycle of operations is repeated.

The completed pipes are removed from the table in succession by a combined transfer and finishing mechanism similar to that described in U. S.

Patent Application Serial Nos. 753,691 and 753,692, reference being made to those specifications for full details of the transfer and finishing operations. The transferring operation is indicated diagrammatically in Figures 6, 7 and 8, the transfer being effected by one of a series of saddles 161 each having a permeable surface 162 to which suction is applied at the moment a saddle 161 reaches the pipe on the table 49. The transferring movement of the saddles 161 is initiated by the table 49 as it approaches the limit of its extrusion movement, a roller 163 having a positive movement in the downward direction only, engaging a slipper 164 movement of which operates a spring-loaded valve 166 controlling the supply of compressed air to a cylinder 167 which effects reciprocation of the saddle-supporting frame 168 in a slide member 169. As the table approaches the limit of its movement under the action of the grabbing device, the roller 163 moves clear of the slipper 164 so that the valve 166 springs back into reverse position and causes retraction of the saddle-supporting frame 168 during the dwell of the table 49 in its lowermost position.

The saddles 161 in this example are mounted on a rotatable member 171, and in addition to their transferring function, they also serve the purpose of supporting the pipes during finishing operations. The rotatable member 171 operates intermittently, and its movements are controlled by a solenoid wired in the circuit controlled by the fringe switch 83, as indicated at 172 in Figure 1, so that each time the switch 83 is operated, the rotatable member 171 is caused to move through a part of a revolution to bring an empty saddle 161 to the transfer station and simultaneously to carry a finished pipe to the delivery station and advance the pipes in the intermediate saddles one station in the finishing cycle.

The combination of press, transfer mechanism, and finishing machine enables a shaped pipe to be withdrawn from the mould and made ready for drying, without manual aid. Use of the fringe as a detector ensures that only when a mould has been filled—whatever the variation in time taken to fill the mould—can a pipe be extruded from the mould, and the remaining operations follow in the desired sequence under the control of mechanisms directly actuated by the fringe or of other mechanisms set in operation by such actuation.

I claim:

1. Method of producing pipes, conduits, or like articles from clay, comprising extruding a mass of clay into a mould chamber the base of which is closed by a movable table for the time being locked against the end of said chamber, causing a fringe of clay to exude from one or more apertures formed between the base of said chamber and the adjacent face of the table as evidence of the completion of a moulding operation in said chamber, and causing said fringe to effect release of said table, thus allowing the moulded article to be extruded from the mould without manual control.

2. Method according to claim 1, comprising moving the table by the force of extrusion, causing the table to effect stoppage of the extrusion of the clay and thus the movement of the table after a pre-determined length of article has been extruded, returning the table to its initial position in engagement with mould, and causing the table to effect recommencement of the extrusion of the clay as the table approaches its initial position.

3. Method according to claim 1, comprising moving the table beyond the limit of its extrusion movement and utilizing such additional movement to cause actuation of a transfer mechanism for removing the articles from the table as they are completed, and causing the table to dwell in its lowermost position during the transferring operation.

4. Method of producing pipes, conduits, or like articles from clay, comprising extruding a mass of clay into a mould chamber the base of which is closed by a movable table for the time being locked against the end of said chamber, causing a fringe of clay to exude from one or more apertures formed between the base of said chamber and the adjacent face of the table as evidence of the completion of a moulding operation in said chamber, causing said fringe to effect release of said table, moving the table by the force of extrusion, causing the table to effect stoppage of the extrusion of the clay and thus the movement of the table after a pre-determined length of article has been extruded, moving the table beyond the limit of its extrusion movement and utilizing such additional movement to cause actuation of a transfer mechanism for removing the articles from the table to a finishing mechanism as they are completed, causing the table to dwell in its lowermost position during the transferring operation, and causing said fringe to effect actuation of the finishing mechanism so that it performs a finishing operation on one article during the extrusion of the next succeeding article and its transfer to the finishing mechanism.

5. A moulding press for forming pipes, conduits, or like articles from clay, comprising a moulding chamber, a base member in said moulding chamber, a movable supporting table, means for locking said table against the end of said moulding chamber leaving an aperture giving access to said moulding chamber, means for extruding clay into said moulding chamber and allowing a fringe of clay to exude through said aperture as evidence of the completion of a moulding operation, and means responsive to the exudation of said fringe for releasing said locking means, thus allowing said table to be moved and the moulded article to be extruded from the moulding chamber without manual control.

6. Apparatus according to claim 5, comprising a counterpoise to enable the table to be lowered by the force of extrusion, means responsive to the movement of the table for stopping the extrusion of the clay after a pre-determined length of article has been extruded, a cutting device arranged to pass through the extruded mass at the base of the moulding chamber to separate the completed article from the mass, means for returning said table to its initial position in engagement with the mould, and means responsive to the movement of the table for recommencing extrusion as the table approaches its initial position.

7. Apparatus according to claim 6, comprising means responsive to the movement of the table for actuating said cutting device as the table reaches the limit of its extrusion movement.

8. Apparatus according to claim 7, comprising means for moving the table beyond the limit of its extrusion movement so as to move the completed article clear of the base of the mould for the purpose of removing the article from the table.

9. Apparatus according to claim 5 comprising a counterpoise to enable the table to be lowered by the force of extrusion, means responsive to the movement of the table for stopping the extrusion of the clay after a pre-determined length of article has been extruded, and means for moving the table beyond the limit of its extrusion movement so as to move the completed article clear of the base of the moulding chamber for the purpose of removing the article from the table.

10. Apparatus according to claim 5, wherein the means for effecting release of said locking means comprises an electric switch disposed in the path of exudation of the fringe.

11. Apparatus according to claim 5, comprising an electric switch disposed in the path of exudation of the fringe, pneumatically operated locking means, an air valve controlling such locking means, and a solenoid arranged to be operated by the fringe-controlled switch and upon such operation to actuate said valve to release said locking means.

12. Apparatus according to claim 11, wherein the solenoid is connected to a two-armed lever, one arm of which is connected to the air valve and the other arm constitutes a reversing lever arranged to be actuated by the table as it returns to its initial position so as to cause the locking device to become operative.

13. A moulding press for forming pipes, conduits, or like articles from clay, comprising a moulding chamber, a base member in said moulding chamber, a freely movable supporting table arranged to be lowered by the force of extrusion, means for temporarily locking said table against the end of said moulding chamber leaving an aperture giving access to said moulding chamber, means for extruding clay into said moulding chamber and allowing a fringe of clay to exude through said aperture as evidence of the completion of a moulding operation, means responsive to the exudation of said fringe for releasing said locking means and thus allowing said table to move and the moulded article to be extruded from the moulding chamber, means responsive to the extrusion movement of the table for stopping the extrusion of the clay and thus the movement of the table after a pre-determined length of article has been extruded, a cutting device arranged to pass through the extruded mass at the base of the moulding chamber to separate the completed article from the mass, a grabbing device for moving the table beyond the limit of its extrusion movement, and means responsive to the movement of the table under the action of the grabbing device for reversing the grabbing device as the table reaches the limit of such movement so as to cause the grabbing device to urge the table in the return direction.

14. Apparatus according to claim 13, wherein the table is counter-balanced and completes its return movement under its own momentum assisted by the locking action of the locking device.

15. Apparatus according to claim 14, comprising a shaft extending downwardly from said table and formed with a reduced portion terminating in a head, a grabbing device including a pair of hook members provided with pins, and a pair of stationary frames formed with cam slots in which said pins are arranged to bear so as to move said hook members into and out of engagement with said head, said hook members being arranged to slide along the reduced portion of said shaft during the reverse movement of said grabbing device so as to cause a dwell of the table in its lowermost position.

16. Apparatus according to claim 15, wherein the locking device comprises toggle mechanism.

17. A moulding press for forming pipes, conduits, or like articles from clay, comprising a moulding chamber, at least one core in said moulding chamber, a base member in said moulding chamber, said base member being formed with an aperture co-operating with said core to form an extrusion throat, a movable die member, a movable supporting table formed with a core member co-operating with said die member, a locking device for urging said table towards said moulding chamber so as to lock said die member between the end of said moulding chamber and said table leaving an aperture giving access to said moulding chamber, means for extruding clay into said moulding chamber and allowing a fringe of clay to exude through said aperture as evidence of the completion of a moulding operation, and means responsive to the exudation of said fringe for releasing said locking device, thus allowing said table to move and extrusion of the article to continue through said extrusion throat.

18. Apparatus according to claim 5, comprising a transfer mechanism for removing the completed articles in succession from the table, and means responsive to the movement of the table as it approaches its lowermost position for actuating the transfer mechanism.

19. Apparatus according to claim 18, comprising a finishing mechanism adapted to receive the articles in succession from the transfer mechanism, and by means responsive to the exudation of the fringe at the press to initiate operation of the finishing mechanism.

20. Method according to claim 1, comprising moving the table by the force of extrusion, causing the table to effect stoppage of the extrusion of the clay after a predetermined length of the article has been extruded, moving the table beyond the limit of its extrusion movement and utilizing such additional movement to cause actuation of a transfer mechanism for removing the articles from the table as they are completed, causing the table to dwell in its lowermost position during the transfer operation, returning the table to its initial position in engagement with the mould, and causing the table to effect re-commencement of the extrusion of the clay as the table approaches its initial position.

JOHN F. BOOTH.

REFERENCES CITED

The following references are of record in the file of this patent:

UNITED STATES PATENTS

| Number | Name | Date |
| --- | --- | --- |
| 1,651,203 | Hibbins | Nov. 29, 1927 |
| 1,875,738 | Jones | Sept. 6, 1932 |
| 2,282,282 | Hamlen | May 5, 1942 |